United States Patent [19]

Garrett

[11] Patent Number: 5,021,529

[45] Date of Patent: Jun. 4, 1991

[54] FORMALDEHYDE-FREE, SELF-CURING INTERPOLYMERS AND ARTICLES PREPARED THEREFROM

[75] Inventor: Robert Y. Garrett, Avon lake, Ohio

[73] Assignee: The BFGoodrich Company, Akron, Ohio

[21] Appl. No.: 595,646

[22] Filed: Oct. 9, 1990

Related U.S. Application Data

[63] Continuation of Ser. No. 402,363, Sep. 5, 1989, abandoned.

[51] Int. Cl.$^5$ ............................................. C08F 20/58
[52] U.S. Cl. .................................. 526/304; 526/329.3; 526/329.4; 428/500
[58] Field of Search .................. 526/304, 329.3, 329.4; 428/500

[56] References Cited

U.S. PATENT DOCUMENTS 3,231,533  1/1966  Garrett ................................. 526/304

Primary Examiner—Paul R. Michl
Assistant Examiner—Thomas McDonald, Jr.
Attorney, Agent, or Firm—Laura F. Shunk

[57] ABSTRACT

An interpolymer that is substantially devoid of formaldehyde and that does not evolve formaldehyde nor decomposes to produce any substantial amount of formaldehyde, is used in the production of impregnated or treated paper, woven and nonwoven fabrics. The interpolymer is produced in latex form by polymerizing in the presence of water, an emulsifier and in initiator, a monomer charge containing at least one polymerizable ethylenically unsaturated monomer and a N-alkylol amide of an alpha, beta ethylenically unsaturated carboxylic acid where the alkylol group contains at least two carbon atoms. Alternatively, the N-alkylol amide can be produced in situ by the reaction of amide of an alpha, beta ethylenically unsaturated carboxylic acid with the corresponding aldehyde to give the desired N-alkylol amide having at least two carbon atoms in the alkylol group.

10 Claims, No Drawings

FORMALDEHYDE-FREE, SELF-CURING INTERPOLYMERS AND ARTICLES PREPARED THEREFROM

This application is a continuation of Application Serial No. 07/402,363, filed on 09/05/89, by Robert Y. Garrett, for "FORMALDE-HYDE-FREE, SELF-CURING INTERPOLYMERS AND ARTICLES PREPARED THEREFROM", now abandoned.

FIELD OF THE INVENTION

This invention relates generally to self-curing interpolymers which are substantially free from formaldehyde as well as the release formaldehyde upon curing or decomposition.

More specifically, the interpolymers contain N-alkylol amide moieties having at least two carbon atoms in the alkylol group of the polymer chain. These interpolymers are used to coat or impregnate paper and other fibrous products such as textiles, or non-woven fabrics to enhance the properties of these articles or otherwise treat a wide variety of substrate materials.

BACKGROUND

Self-curing, heat reactive interpolymers, prepared by copolymerizing N-alkylol amides of alpha, beta ethylenically unsaturated carboxylic acids with other comonomers, have been widely used to coat or otherwise treat paper and other fibrous products such as textiles, or nonwoven fabrics to enhance various properties including strength, tear, bonding, softness (hand), printability, flexibility, dry cleanability, and the like. These interpolymers can also be used to treat plastics, metal and wood substitutes. Evidence has shown that N-methylol acrylamide, the preferred alkylol amide used in these interpolymers, releases formaldehyde vapors at typical drying/curing temperatures for articles coated or impregnated with these interpolymer emulsions. Questions have been raised as to the safety of exposure to formaldehyde both through bodily contact with products containing formaldehyde, and with formaldehyde vapors. Thus, formulators have been seeking formaldehyde-free interpolymers.

Interpolymers containing the above-described N-alkylol amide moieties are disclosed in U.S. Pat. No. 323,533. This patent discloses acrylate based interpolymers containing preferably N-methylol acrylamide and methacrylamide moieties useful as coating and/or treating agents for paper and other fiber containing articles.

In general, self-curing interpolymers, as discussed above, and other similar latex binders are used to impart strength and dimensional stabilitY to paper, nonwoven and woven fabrics. A nonwoven fabric is a textile structure consisting of a mat of fibers held together by a binder. The fibers can be partially or completely oriented or they can be randomly distributed.

Nonwoven fabrics are popular owing to the simplicity and economy of their production since the traditional weaving operations are not used; hence, less equipment, less space, and fewer personnel are required. Nonwoven fabrics can also be produced from what would normally be considered as waste fibers, and useful characteristics are obtained which may not be provided by woven or knitted fabrics.

Enormous quantities of fibers are consumed annually in the manufacture of articles such as clothing, interliners, filters, automotive door panels, heat and electrical insulation packaging, sanitary napkins, fillers for quilted articles, wiping cloths, towels, masks, wall coverings, shoe uppers and liners, curtains and draperies, tea bags, simulated leather gaskets, luggage, ribbons, and diapers.

To obtain a nonwoven fabric with substantially uniform strength in all directions, random distribution of the fibers has been achieved by several methods. One of the most popular of such methods involves air-laying of the fibers by stripping the fibers from a carded web by means of an air stream which then directs the fibers through a restricting throat which is controlled to adjust the thickness of the resulting web.

A number of methods have been developed for treating randomly dispersed webs with a binder. Typically, a water-based emulsion binder system is used in which a thermoplastic or thermoset synthetic polymer latex is included and a loose web of fibers to be treated is immersed therein or sprayed therewith using special equipment which accommodates the structural weakness of the web. The treated web is then dried and cured to effect proper bonding. Alternatively, an aqueous or solvent solution binder system of a thermoplastic or thermoset resin may be used to impregnate the fibrous web.

The strength and dimensional stability that is required of paper, nonwoven and woven fabrics is currently achieved by bonding fibers in place with a latex that is crosslinkable. Usually, it has been known to obtain crosslinking by the copolymerization of functional or reactive monomers into the major copolymer backbone. Examples of such common commercial reactive monomers include N-methylol acrylamide, N-(n-butoxy methyl) acrylamide, N-(iso-butoxy methyl) acrylamide, N-methylol methacrylamide, and other similar materials. These monomers undergo a condensation reaction on crosslinking that evolves formaldehyde. These monomers also contain formaldehyde as an impurity. In addition to the use of these reactive monomers, crosslinking has also been attained by post-adding various aminoplasts to the latex. In these prior art situations, the use of condensates of melamine and formaldehyde has been prevalent.

On the basis of information presented above, it has been believed that the latex systems used in the past evolved formaldehyde to achieve crosslinking of the polymer solids in the latex binder and/or with the substrate. Of course, precautions have been taken to eliminate or reduce the potential hazards this represents. Nonetheless, it would be of great advantage to develop interpolymers which neither contain nor release formaldehyde.

SUMMARY OF THE INVENTION

Self-curing, substantially formaldehyde-free interpolymers have been developed in accordance with the present invention. The interpolymers according to the present invention are substantially free from formaldehyde and do not evolve or decompose to produce substantial amounts of formaldehyde,. particularly upon curing. This is highly desirable.

Further in accordance with the present invention, an efficient and economical process has been developed for preparing self-curing interpolymers containing N-alkylol moieties.

Still further in accordance with the present invention, articles of manufacture treated with a formaldehyde-free, self-curing interpolymer which enhances the properties of the article is provided.

Still further in accordance with the present invention, self-curing interpolymers in latex form are provided that are substantially free from formaldehyde and do not evolve or decompose to produce formaldehyde; particularly on curing.

Still further in accordance with the present invention, substantially formaldehyde-free, self-curing interpolymers are provided, the repeating units of which are derived from a major effective amount of at least one polymerizable ethylenically unsaturated monomer and at least one N-alkylol amide of an alpha, beta ethylenically unsaturated carboxylic acid that is produced in situ by the reaction of an amide of an alpha, beta ethylenically unsaturated carboxylic acid and an aldehyde of at least two carbon atoms.

These and other aspects of the present invention will become apparent to those skilled in the art upon the reading and understanding of the specification.

DETAILED DESCRIPTION OF THE INVENTION

It has been discovered in accordance with the present invention that substantially formaldehyde-free, self-curing interpolymers may be made by incorporating in the backbone N-ethylol acrylamide, N-propylol acrylamide, N-butylol acrylamide, N-benzylol acrylamide, or derivatives based upon the same. Such polymers may be used to treat articles without any substantial concern of releasing formaldehyde. By "substantially free from formaldehyde" it is meant that the interpolymer has a formaldehyde level of less than 10 ppm. Theoretically, the product should contain no formaldehyde, however, as low levels of contaminants may be present in the reactants, it is possible that low levels of formaldehyde may also be present. Such levels may be undetectable or may even be present to a level of about 5 ppm. In any case, these levels are much lower than those previously resulting from the use of N-methylol as the alkyolamide.

The interpolymers according to the present invention are derived from a major effective amount of at least one polymerizable ethylenically unsaturated monomer, and preferably from at least two monomers selected from the group consistinng essentially of ethylenically unsaturated hydrocarbon monomers, ethylenically unsaturated halogenated monomers, acrylonitrile and its homologs, esters of ethylenically unsaturated carboxylic acids, and other esters which include an ethylenic unsaturation. By "major effective amount" as used herein, it is generally meant an amount in the range from about 75 to about 99.5 percent; and more preferably from about 80 to about 99 percent; and most preferably from about 88 to about 98 percent for a latex emulsion interpolymer and solution polymerized interpolymer, and from about 85 to about 98 percent for a hydrophilic interpolymer. These percentages are percentages by weight based on the weight of the monomers used to make the interpolymer. Representative of preferred ethylenically unsaturated hydrocarbon monomers include ethylene, propylene, 1-butene, !-hexene, !-heptene, ? -octene, butadiene, hexadiene, isoprene, styrene, methyl styrene, divinyl benzene and the like. Representative of preferred ethylenically unsaturated halogenated monomers include vinyl chloride, vinylidene chloride, chloroprene, chlorostyrene and the like.

Representative of preferred esters of ethylenically unsaturated carboxylic acids include alkyl acrylates and methacrylates wherein the alkyl group contains 1-2 carbon atoms and esters of such acids as butenoic, maleic, fumaric, itaconic and the like. Representative of other esters which have an ethylenic unsaturation and are preferred include vinyl acetate, vinyl formate, vinyl versatate, and the like.

The alkyl acrylates that can be used to prepare the acrylic ester latex binders of this invention include alkyl acrylates and alkyl methacrylates containing 1 to 12, preferably 1 to 10 carbon atoms in the alkyl group. The polymer backbone in the acrylic ester latexes can be either hydrophilic or hydrophobic and it can comprise polymerized soft monomers and/or hard monomers. The soft and hard monomers are monomers which, when polymerized, produce soft or hard polymers, or polymers in between. Preferred soft acrylic ester monomers are selected from alkyl acrylates containing 2 to 8 carbon atoms in the alkyl group and include ethyl acrylate, propyl acrylate, n-butyl acrylate, and 2-ethylhexyl acrylate. The hard acrylic ester monomers are selected from alkyl methacrylates containing to 3 carbon atoms in the alkyl group and from non-acrylic monomers such as styrene and substituted styrenes, acrylonitrile, vinyl chloride, and generally any compatible monomer the homopolymer of which has a Tg above 50° C. Preferred acrylic ester monomers are selected from alkyl methacrylates containing 1 to 2 carbon atoms in the alkyl group, especially methyl methacrylate. A favorable copolymer backbone is the polymerization product of 75 to 98 percent ethyl acrylate and from 2 to 25 percent acrylonitrile.

Suitable major backbone compositions preferred according to the present invention, include the following or mixtures thereof where applicable: butadiene/styrene; butadiene/acrylonitrile; acrylic esters; butadiene/acrylic esters; vinyl chloride; vinylidene chloride; vinyl acetate; ethylene/vinyl chloride; ethylene/vinyl acetate; and the like. Butadiene/acrylonitrile is a preferred backbone composition where dry cleaning resistance is desired.

With respect to the N-alkylolamides of alpha, beta ethylenically unsaturated carboxylic acids, these monomers can be prepared in situ during the preparation of the interpolymer and are derived from amides of alpha, beta ethylenically unsaturated carboxylic acids and the corresponding aldehydes. For example, acrylamide and acetaldehyde react in situ to form N-ethylol acrylamide. Likewise, acrylamide and benzaldehyde react in situ to form N-benzylol acrylamide during polymerization. This reaction is further illustrated below:

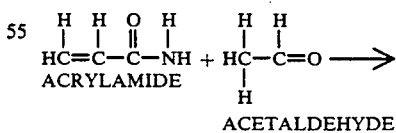
ACRYLAMIDE  ACETALDEHYDE

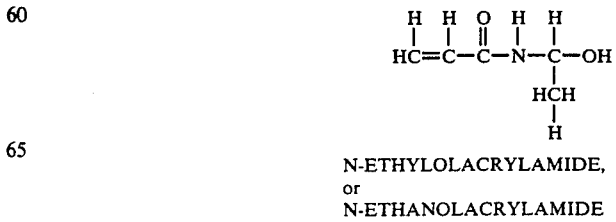
N-ETHYLOLACRYLAMIDE,
or
N-ETHANOLACRYLAMIDE

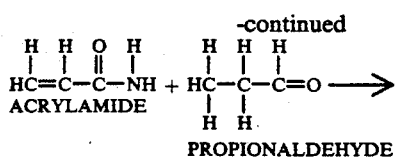
PROPIONALDEHYDE

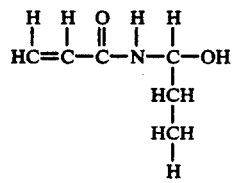
N-PROPANOL ACRYLAMIDE, OR
N-PROPYLOL ACRYLAMIDE

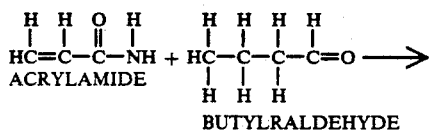
BUTYLRALDEHYDE

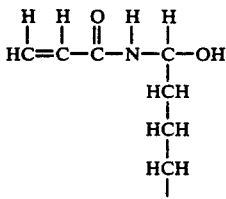
N-BUTANOL ACRYLAMIDE, OR
N-BUTYLOL ACRYLAMIDE

Alternatively, of course, these alkylolamides can be prepared independently and subsequently copolymerized. The alkylolamides can also be termed alkanolamide, and alternative names are suggested above for preferred examples.

Various amides of alpha, beta ethylenically unsaturated carboxylic acids may be used for the purposes of the present invention and include acrylamide, methacrylamide, maleamide, maleimide, benzamide, 4-vinyl benzamide and the like. Representative aldehydes useful in the above-described reaction include $C_2$–$C_8$ aldehydes such as acetaldehyde, propionaldehyde, butyraldehyde and the like.

The interpolymers of the present invention can be made by emulsion polymerization or by solution polymerization utilizing polar and/or non-polar solvents. The preferred method is an emulsion polymerization method to give an interpolymer latex. This process is generally conducted in the presence of water, an emulsifier, and an initiator, as well as other such polymerization aids.

Thus, one or more principal monomers may be polymerized with one or more suitable comonomers noted below also in the presence of an amide and an aldehyde in preparing a latex binder for use in treating paper, woven and nonwoven fabrics composed of suitable fibers. Generally speaking, examples of such comonomers include ethylenically unsaturated monocarboxylic acids containing 3 to 5 carbon atoms, such as acrylic, methacrylic, ethacrylic, and cyanoacrylic acids; ethylenically unsaturated nitriles containing 3 to 5 carbon atoms, such as acrylonitrile and methacrylonitrile; vinyl ethers containing 4 to 22 carbon atoms, such as ethyl vinyl ether, chloroethyl vinyl ether, isobutyl vinyl ether, cetyl vinyl ether, and lauryl vinyl ether; vinyl ketones containing 2 to 12 carbon atoms, such as methyl vinyl ketone; acrylic esters containing 1 to 12 carbon atoms in the alkyl group, such as alkyl acrylates and alkyl methacrylates, specifically including ethyl acrylate, n-butyl acrylate, 2-ethylhexyl acrylate, and methyl methacrylate; vinyl esters of carboxylic acids containing 4 to 22 carbon atoms, such as vinyl acetate, vinyl versatate, vinyl propionate, vinyl formate, vinyl stearate, vinyl benzoate, and vinyl and allyl chloroacetates; alpha olefins containing 2 to 12 carbon atoms, such as ethylene, propylene, isobutylene, and butene-I; dienes containing 4 carbon atoms, such as butadiene and isoprene; styrene and styrene derivatives such as styrene itself, alpha methyl styrene, vinyl toluene, and chlorostyrene; vinyl and vinylidene halides, such as vinyl chloride and vinylidene chloride; and the like.

When emulsifiers are used to prepare the latexes of this invention, the usual types of anionic and nonionic emulsifiers may be employed. Suitable anionic emulsifiers include alkali metal or ammonium salts of the sulfates of alcohols containing 8 to 18 carbon atoms such as sodium lauryl sulfate, alkali metal and ammonium salts or sulfonated petroleum and paraffin oils, sodium salts or sulfonic acids, alkylaryl sulfonates, alkali metal and ammonium salts of sulfonated dicarboxylic acid esters, and the like. Nonionic emulsifiers such as octyl or nonylphenyl polyethoxyethanol can also be used. Latexes of excellent stability can be prepared with emulsifiers selected from alkali metal and ammonium salts of aromatic sulfonic acids, alkyl and alkylaryl sulfonates, alkyl sulfates, and poly(oxyalkylene) sulfonates.

The amount of emulsifiers can vary up to about 5 parts, such as 0.0! to 7 parts by weight per I00 parts by weight of the monomers, and excellent results can be obtained with 0.01 to 1 part of emulsifiers. The latexes described herein are more preferably prepared using very low to moderate levels of emulsifiers, such as 0.005 to 1 part by weight, the most preferred being in the range of 0.1 to 0.5 dry parts per 100 parts of monomers. The emulsifier cab be added at the outset of the polymerization or it can be added incrementally throughout the polymerization.

The polymerization of the latex monomers disclosed herein can be conducted at temperatures of about 5° C. to about 95° C., typically about 30° to about 85° C., in the presence of a compound capable of initiating polymerization. Commonly used free radical initiators include the various peroxides, t-butyl hydroperoxide, and cumene hydroperoxide; and azo compounds such as azodiisobutyronitrile and dimethylazodiisobutyrate. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds, a reducing sugar, dimethylaminopropionitrile, a diazomercaptan compound, and a water-soluble ferrous sulfate compound. Polymer latexes with excellent stability can be obtained using alkali metal and ammonium persulfate initiators. The amount of initiator used will generally be in the range of 0.0I to 3% by weight, based on the weight of the monomers, preferably between 0.2 to 1%. The initiator can be charged at the outset of the polymerization, however, incremental addition of the initiator throughout polymerization can also be employed and is often advantageous.

Typical polymerization for the preparation of the acrylic ester latexes described herein is conducted by charging the reactor with appropriate amount of water, emulsifier and electrolyte, if any is employed, and a portion of the initiator sufficient to initiate polymerization. The reactor is then evacuated, heated to the initiation temperature, and the monomer and emulsifier are proportioned over several hours. The rate of proportioning is varied depending on the polymerization temperature, the particular initiator employed and the amount of the monomer(s) being polymerized. The rate of polymerization can be increased by metering in an initiator solution. After all the components have been charged, the reaction is run for a length of time necessary to achieve the desired conversion. The pH of the latex is in the range of about 2 to b 10.

The latexes described herein can be compounded with, or have mixed therein, other known ingredients such as emulsifiers, curing agents, fillers, plasticizers, antioxidants or stabilizers, antifoaming agents, dying adjuvants, pigments, or other compounding aids. Furthermore, thickeners or bodying agents may be added to the polymer latexes so as to control the viscosity of the latexes and thereby achieve the proper flow properties for the particular application desired.

Specifically, the latexes described herein are suitable for use as binders for natural materials and for blends of natural materials with synthetics. The materials referred to herein include, in particular, paper made by bonding cellulosic fibers with the latex binder of this invention; nonwoven fabric made by bonding natural, synthetic, or a mixture of such fibers with the binder of this invention; and woven fabrics treated with a latex binder.

Among the wide variety of applications that can be listed for the latex binders described herein, many of these products require a desirable degree of water resistance, as indicated by their wet strength, but at the same time must maintain a level of water permeability so as to permit transport of body fluids, such as perspiration and urine, through the coverstock into the underlying absorptive pad. A particularly interesting application disclosed herein is a corduroy backcoating wherein the latex is applied to the back side of a formed corduroy fabric for pile retention, dimensional stability, strength, and good hand.

Latexes of the present invention can be applied to the substrate in any suitable fashion as by spraying, dipping, roll-transfer, brushing, or the like. Application of the latexes to the fibers is preferably made at room temperature to facilitate cleaning of the associated apparatus. The non-volatile solids concentration of the latexes can be in the range of 5 percent to 70 percent by weight, and preferably from 5 percent to 25 percent when applied by dipping. When applied by roll-transfer, solids concentration of the latexes is generally about 40–50 percent whereas with the spraying technique, the range is wider.

The proportion of a latex polymer that is applied to the web or mat is such as to provide I0 to 100 percent, preferably 25 to 40 percent by weight of the polymer, based on the total weight of the polymer and fibers. After application of the latex to the fibrous web, the impregnated or saturated web is dried either at room temperature or at elevated temperature. The web is subjected, either after completion of the drying or as the final step of the drying stage itself, to a baking or curing operation which may be effected at a temperature of about 100° C to about 400° C for a period which may range from about one-half hour at the lower temperatures to as low as a fraction of a second at the upper temperatures. The conditions of baking and curing are controlled so that no appreciable deterioration or degradation of the fibers or polymer occurs. Preferably, the curing is effected at a temperature of 120° C to 160° C for a period of 0.5 to 10 minutes.

Described below is an example of an application of a latex polymer in accordance with the invention to a web or mat.

An acid catalyst can be included in the latexes at the time it is applied to the fibrous web, or it may be applied to the fibrous web before or after the latex is applied. Examples of acidic catalysts that may be employed include oxalic acid, dichloracetic acid, p-toluenesulfonic acid, and salts such as ammonium sulfate and hydrochloride of 2-methyl-2-aminopropanol-1.

When the latex polymer is used as a binder, the fibers may be in the form of nonwoven mats or webs in which they are ordered or are randomly distributed. The web can be formed by carding when the fibers are of such a character, by virtue of length and flexibility, as to be amenable to the carding operation. The fibers may comprise natural textile fibers such as cellulose, jute, sisal, ramie, hemp and cotton, as well as many of the synthetic organic textile fibers including rayon, those of cellulose esters such as cellulose acetate, vinyl resin fibers such as those of polyvinyl chloride and copolymers thereof, polyacrylonitrile and copolymers thereof, polyesters such as poly(ethylene terephthalate), polymers and copolymers of olefins such as ethylene and propylene, condensation polymers such as polyimides or nylon types, and the like. The fibers used can be those of a single composition or mixtures of fibers in a given web.

The following examples are presented for the purpose of illustrating the invention disclosed herein in greater detail. The examples are not, however, to be construed as limiting the invention herein in any manner, the scope of which is defined by the appended claims.

In the following illustrative examples the quantities of ingredients used are expressed in parts by weight unless otherwise indicated.

EXAMPLLE 1

An interpolymer (A) of ethyl acrylate, acrylonitrile, itaconic acid and N-ethylol acrylamide was prepared from the following ingredients:

| Water | 86 |
|---|---|
| Sodium Lauryl sulfate | 1.7 |
| Ammonium carbonate | 0.2 |
| Ammonium persulfate | 0.3 |
| Ethyl acrylate | 84 |
| Acrylonitrile | 6 |
| Itaconic acid | 4 |
| N-ethylol acrylamide | 6 |

The polymerization reactor is charged with about 56 parts of water containing the dissolved electrolyte. A separate mixture of 30 parts of water, emulsifier and monomers is stirred rapidly until. emulsified. The contents of the reactor are then brought to a temperature of from 82–84° C. The catalyst which is dissolved in 1 part of water is added all at once to the reactor and stirring is commenced. The remainder of the monomer emulsion is proportioned into the reactor and the polymerization is carried out at about 84° C with continuous stirring. The addition is completed in two hours. The polymerization is carried to more than 90 percent conversion and preferably to complete conversion of monomers to polymer. The dried polymers prepared in this manner generally are of high molecular weight. In the foregoing manner other polymers having the compositions designated B in Table I were also prepared. Polymers B and C of Table I are control compositions which are outside the scope of the present invention.

pickup, dry and wet tensile, solvent tensile (perchloroethylene), edge tear, internal bond strength, wet/dry tensile ratio, and solvent/dry tensile ratio. Tensile strength values are expressed in pounds. Tensile ratios are stated as percent, internal bond in grams, and edge tear in pounds per inch.

Specimens for solvent tensile were soaked 20 minutes in perchloroethylene and tested in the machine direction. Wet tensile specimens were soaked overnight in demineralized water and were tested in the machine direction. Dry tensile specimens were also tested in the machine direction.

TABLE I

| SAMPLE | B | C | D | E | F | G | H | I | J | K | L | M | N | O | P | Q | R | S |
|---|---|---|---|---|---|---|---|---|---|---|---|---|---|---|---|---|---|---|
| Ethyl Acrylate | 94 | 91 | 94 | 93 | 92 | 90 | 89 | 88 | 87 | 87 | 85 | 87 | — | 86 | 60 | 20 | 84 | 83 |
| Acrylonitrile | 3 | 6 | 6 | 6 | 6 | 6 | 6 | 6 | 6 | 6 | 6 | 6 | — | 6 | — | — | 6 | 6 |
| Acrylic Acid | 1 | 1 | — | 1 | — | 1 | 1 | 1 | — | — | — | — | 8 | — | — | — | — | — |
| Itaconic Acid | — | — | — | — | — | — | — | — | 4 | 4 | 4 | 4 | — | 3 | 4 | 4 | 4 | 4 |
| N-Methylolacrylamide | 2 | 2 | — | — | 2 | — | — | — | — | — | — | — | — | — | — | — | — | — |
| N-Ethylolacrylamide | — | — | — | — | — | 3 | — | — | 3 | — | — | — | 19 | 3 | 3 | 3 | 6 | — |
| N-Propylolacrylamide | — | — | — | — | — | — | 4 | — | — | 3 | — | — | — | — | — | — | — | 7 |
| N-Butylolacrylamide | — | — | — | — | — | — | — | 5 | — | — | 5 | — | — | — | — | — | — | — |
| Acetyldehyde | — | — | — | — | — | — | — | — | — | — | — | 1[1] | — | — | — | — | — | — |
| Acrylamide | — | — | — | — | — | — | — | — | — | — | — | 2[1] | — | 2 | — | — | — | — |
| Styrene | — | — | — | — | — | — | — | — | — | — | — | — | — | — | 33 | — | — | — |
| Vinyl Acetate | — | — | — | — | — | — | — | — | — | — | — | — | — | — | — | 73 | — | — |
| Methylmethacrylate | — | — | — | — | — | — | — | — | — | — | — | — | 73 | — | — | — | — | — |
| Molecular Equivalent to N-MA | — | — | — | — | — | 1.5 X | 1.5 X | 2.0 X | 1.5 X | 1.5 X | 2.0 X | 1.5 X | 1.0 X | 1.5 X | 1.5 X | 1.5 X | 3.0 X | 3.0 X |

[1]formed by in-situ reaction

EXAMPLE 2

Test Methods

Latexes of represented polymers described in Example 1 were reduced to about 35 percent total solids by dilution with water. Whatman #4 base paper sheets were dipped in each latex bath, passed through a padder with regulators set at 15 psi pressure, and hang-dried on a rack in a conditioned room at 50 percent relative humidity and 70oF ambient temperature. Percent polymer pickup in the paper was determined by differential paper weight before and after saturation. Target pickup range was 40 to 50 percent.

The treated sheets of Whatman #4 paper were cured at room temperature, and at 1, 5, and 10 minutes at 3000 and 325oF respectively in a circulating air oven. The cured sheets were then tested for percent polymer Latex films were prepared for testing by first thickening the emulsions with 5 percent Alcogum using low-speed agitation to avoid entrapping air bubbles. A 15 mil thick film was cast on a glass plate, carefully avoiding air bubbles in the film. The glass plate with cast film was placed in a film cabinet and allowed to dry at room temperature.

Films were lightly powdered with talcum for ease of handling. Films were cured at room temperature and at 300° F. for 5 minutes. Dumbbells were died out (4¼") from sections of film with no faults (bubbles, cracks, etc.)). Film thickness was measured and recorded.

Films were tested in a Thwing-Albert tensile testing machine and values are reported in pounds per square inch.

The results of the foregoing tests are set forth in Table II.

TABLE II

| | SATURATED WHATMAN #4 PAPER | | | | | | | | | | | | | | | | | |
|---|---|---|---|---|---|---|---|---|---|---|---|---|---|---|---|---|---|---|
| SAMPLE | B | C | D | E | F | G | H | I | J | K | L | M | N | O | P | Q | R | S |
| % Pickup | 46 | 40 | 52 | 51 | 46 | 50 | 51 | 49 | 45 | 39 | 42 | 44 | * | 44 | 45 | 51 | 51 | 49 |
| Dry Tensile | | | | | | | | | | | | | | | | | | |
| 1' @ R.T. | 25.6 | 27.4 | 22.1 | 24.3 | 27.3 | 30.7 | 30.3 | 30.6 | 30.1 | 32.3 | 33.7 | 29.7 | | 32.4 | 42.1 | 49.6 | 36.7 | 37.9 |
| 1' @ 300° F. | 29.9 | 31.9 | 22.0 | 23.8 | 31.3 | 32.1 | 31.6 | 31.3 | 31.4 | 33.4 | 34.5 | 31.4 | | 34.3 | 45.3 | 50.5 | 37.8 | 38.8 |
| 1' @ 325° F. | 30.1 | 31.9 | 22.2 | 23.4 | 31.6 | 31.6 | 31.4 | 30.8 | 32.5 | 33.2 | 33.7 | 32.6 | | 34.4 | 47.1 | 51.2 | 38.2 | 38.2 |
| 5' @ 300° F. | 30.4 | 28.9 | 22.0 | 23.8 | 31.8 | 31.6 | 31.5 | 31.0 | 33.6 | 32.7 | 33.4 | 33.3 | | 34.9 | 47.9 | 51.4 | 37.1 | 37.7 |
| 5' @ 325° F. | 29.5 | 29.7 | 20.1 | 22.6 | 29.1 | 29.3 | 28.9 | 29.2 | 31.8 | 30.2 | 31.5 | 31.6 | | 33.7 | 47.0 | 51.8 | 35.8 | 36.7 |
| 10' @ 300° F. | 29.8 | 29.5 | 20.9 | 22.9 | 29.3 | 30.1 | 30.3 | 30.5 | 32.3 | 31.9 | 8.9 | 32.1 | | 33.9 | 46.4 | 53.3 | 36.9 | 36.2 |
| 10' @ 325° F. | 27.6 | 28.0 | 19.4 | 21.5 | 27.5 | 26.9 | 27.7 | 27.4 | 30.1 | 27.6 | 8.4 | 30.1 | | 31.4 | 46.8 | 47.3 | 33.5 | 35.0 |
| Wet Tensile | | | | | | | | | | | | | | | | | | |
| 1'@ R.T. | 2.0 | 1.2 | 1.1 | 1.1 | 2.5 | 1.6 | 1.1 | 1.0 | 2.0 | 2.2 | 2.0 | 1.5 | | 2.3 | 1.5 | 3.2 | 1.6 | 1.4 |
| 1' @ 300° F. | 16.5 | 18.6 | 1.8 | 2.7 | 18.8 | 13.6 | 8.8 | 6.8 | 7.2 | 9.9 | 9.8 | 8.5 | | 14.2 | 14.9 | 14.7 | 7.9 | 9.5 |
| 1' @ 325° F. | 19.2 | 20.5 | 2.4 | 3.6 | 19.2 | 11.6 | 8.9 | 6.4 | 10.5 | 12.6 | 12.2 | 11.5 | | 10.9 | 20.0 | 20.4 | 11.4 | 13.1 |
| 5' @ 300° F. | 20.1 | 18.6 | 2.8 | 4.7 | 19.8 | 12.6 | 9.6 | 7.8 | 15.1 | 15.6 | 16.0 | 15.9 | | 14.2 | 24.7 | 27.4 | 15.4 | 17.3 |
| 5' @ 325° F. | 17.7 | 18.5 | 4.4 | 6.7 | 16.9 | 11.7 | 10.3 | 9.4 | 15.8 | 15.4 | 15.9 | 15.9 | | 15.4 | 23.2 | 28.6 | 17.3 | 18.1 |
| 10' @ 300° F. | 19.6 | 18.6 | 3.6 | 6.0 | 17.1 | 11.5 | 10.6 | 8.8 | 15.7 | 16.5 | 15.5 | 16.3 | | 14.6 | 23.1 | 27.5 | 16.9 | 17.8 |
| 10' @ 325° F. | 16.8 | 16.3 | 5.2 | 6.9 | 14.9 | 10.7 | 10.2 | 9.4 | 15.6 | 14.1 | 15.1 | 14.8 | | 13.7 | 22.5 | 25.5 | 16.3 | 17.0 |
| Solvent Tensile | | | | | | | | | | | | | | | | | | |
| 1' @ R.T. | 8.4 | 5.4 | 3.5 | 5.0 | 6.0 | 7.6 | 6.9 | 6.6 | 16.9 | 15.8 | 14.7 | 16.4 | | 19.4 | 11.0 | 26.9 | 24.2 | 23.5 |
| 5' @ 300° F. | 18.9 | 18.4 | 3.7 | 4.9 | 18.5 | 10.6 | 8.2 | 7.3 | 18.9 | 13.6 | 12.7 | 15.5 | | 17.5 | 7.8 | 25.7 | 20.9 | 19.5 |

*SAMPLE NOT TESTED (Too Brittle)

TABLE II-continued

| SAMPLE | SATURATED WHATMAN #4 PAPER | | | | | | | | | | | | | | | | | |
|---|---|---|---|---|---|---|---|---|---|---|---|---|---|---|---|---|---|
| | B | C | D | E | F | G | H | I | J | K | L | M | N | O | P | Q | R | S |
| Edge Tear | | | | | | | | | | | | | | | | | | |
| 1' @ R.T. | 11.7 | 0.9 | 12.4 | 12.9 | 13.1 | 10.6 | 11.7 | 10.1 | 9.3 | 7.5 | 8.6 | 9.0 | * | 7.4 | 5.5 | 5.5 | 7.0 | 8.3 |
| 5' @ 300° F. | 7.9 | 0.7 | 11.6 | 11.7 | 7.3 | 11.0 | 9.1 | 12.1 | 8.0 | 7.1 | 7.4 | 8.2 | | 6.7 | 4.9 | 3.9 | 6.2 | 5.7 |
| Internal Bond Strength | | | | | | | | | | | | | | | | | | |
| 1' @ R.T. | 539 | 541 | 551 | 597 | 587 | 804 | 761 | 712 | 642 | 645 | 693 | 603 | | 603 | 690 | 872 | 809 | 808 |
| 5' @ 300° F. | 571 | 647 | 600 | 658 | 723 | 746 | 807 | 745 | 702 | 687 | 760 | 681 | | 708 | 830 | 968 | 870 | 861 |
| Wet/Dry Tensile Ratio | | | | | | | | | | | | | | | | | | |
| 1' @ R.T. | 7.8 | 4.2 | 5.0 | 4.5 | 9.2 | 5.2 | 3.5 | 3.4 | 6.6 | 6.8 | 5.9 | 5.1 | | 7.1 | 3.6 | 6.5 | 4.4 | 3.7 |
| 1' @ 300° F. | 55.2 | 58.3 | 8.2 | 11.3 | 60.1 | 42.4 | 27.8 | 21.7 | 22.9 | 29.6 | 28.4 | 27.1 | | 41.4 | 32.9 | 29.1 | 20.9 | 24.5 |
| 1' @ 325° F. | 63.8 | 64.3 | 10.8 | 15.4 | 60.8 | 36.7 | 28.3 | 20.8 | 32.3 | 38.0 | 36.2 | 35.3 | | 31.7 | 42.5 | 39.8 | 29.8 | 34.3 |
| 5' @ 300° F. | 66.1 | 64.4 | 12.7 | 19.7 | 62.3 | 39.9 | 30.5 | 25.2 | 44.9 | 47.7 | 47.9 | 47.7 | | 40.7 | 51.6 | 53.3 | 41.5 | 45.9 |
| 5' @ 325° F. | 60.0 | 62.3 | 21.9 | 29.6 | 58.1 | 39.9 | 35.6 | 32.2 | 49.7 | 51.0 | 50.5 | 50.3 | | 45.7 | 49.4 | 55.2 | 48.3 | 49.3 |
| 10' @ 300° F. | 65.8 | 63.1 | 17.2 | 26.2 | 58.4 | 38.2 | 35.0 | 28.9 | 48.6 | 51.7 | 48.0 | 50.8 | | 43.1 | 49.8 | 51.6 | 45.8 | 49.2 |
| 10' @ 325° F. | 60.9 | 58.2 | 26.8 | 32.1 | 54.2 | 39.8 | 36.8 | 34.3 | 51.8 | 51.1 | 50.2 | 49.2 | | 43.6 | 48.1 | 53.9 | 48.7 | 48.6 |
| Solvent/Dry Tensile Ratio | | | | | | | | | | | | | | | | | | |
| 1' @ R.T. | 32.8 | 19.7 | 15.8 | 20.6 | 22.0 | 24.8 | 22.8 | 21.6 | 56.1 | 48.9 | 43.6 | 55.2 | | 59.9 | 26.1 | 54.2 | 65.9 | 62.0 |
| 5' @ 300° F. | 62.2 | 63.7 | 16.8 | 20.6 | 58.2 | 33.5 | 26.0 | 23.5 | 56.3 | 41.6 | 38.0 | 46.5 | | 50.1 | 16.3 | 50.0 | 56.3 | 51.7 |
| Film Tensile | | | | | | | | | | | | | | | | | | |
| 1' @ R.T. | 470 | 430 | 150 | 200 | 350 | 700 | 720 | 570 | 900 | 1080 | 1090 | 1220 | | 1650 | ** | ** | 2100 | 1790 |
| 5' @ 300° F. | 480 | 780 | 180 | 240 | 560 | 640 | 610 | 630 | 960 | 1010 | 1170 | 1130 | | 2140 | ** | ** | 2100 | 2270 |

*sample not tested
**too brittle

While in accordance with the Patent Statutes, the best mode and preferred embodiment has been set forth, the scope of the invention is not limited thereto, but rather by the scope of the attached claims.

What is claimed is:

1. A substantially formaldehyde-free, self-curing interpolymer comprising repeating units derived from
   a) from about 75 to about 99.5 percent by weight of at least one monomer selected from the group consisting of butadiene, styrene, ethylene, propylene, isoprene, methyl styrene, vinyl chloride, vinylidene chloride, chloroprene, chlorostyrene, vinyl acetate, acrylonitrile and its homologs, esters of saturated carboxylic acids and acrylic esters of ethylenically unsaturated functionalized monomers and containing 1 to 12 carbon atoms in the alkyl group, and where said functionality is selected from the group selected from hydroxyl, carboxyl, amide, and epoxy and vinyl; and
   b) from about 0.5 to about 25 percent by weight of at least one N-alkylol amide of an alpha, beta ethylenically unsaturated carboxylic acid selected from the group consisting of N-ethylol acrylamide, N-ethylol methacrylamide, N-ethylol maleimide, N-propylol acrylamide, N-propylol methacrylamide, N-propylol maleimide, N-butylol acrylamide, N-butylol methacrylamide, N-butylol maleimide, N-benzylol acrylamide, N-benzylol methacrylamide, and mixtures thereof;
   and said at least one monomer having at least one comonomer comprising itaconic acid.

2. The interpolymer according too claim 1, wherein said interpolymer is derived from
   a) a major effective amount of at least one monomer selected from the group consisting of styrene, butadiene, acrylonitrile, vinyl acetate, ethyl acrylate, butyl acrylate, methyl acrylate, vinyl chloride, methyl methacrylate, 2-ethylhexyl acrylate, ethylene and propylene, wherein said comonomer is not an acrylate ester; and
   b) minor effective amount of an N-alkylol amide of an alpha, beta ethylenically unsaturated carboxylic acid selected from the group consisting of N-ethylol acrylamide, N-ethylol methacrylamide, N-propylol acrylamide, N-propylol methacrylamide, N-butylol acrylamide, N-butylol methacrylamide, N-benzylol acrylamide, N-benzylol methacrylamide, or mixtures thereof.

3. The interpolymer according to claim 2, wherein said interpolymer is prepared in the form of a latex.

4. An interpolymer according to claim 1, wherein said at least one monomer comprises from about 80 to 99 percent by weight and said N-alkylol amide comprises from about 1 to about 20 percent by weight.

5. An interpolymer according to claim 4, wherein said at least one monomer comprises from about 85 to 98 percent by weight and said N-alkylol amide amount comprises from about 2.0 to about 15 percent by weight.

6. The interpolymer according to claim 1, wherein said amide is produced in situ during polymerization by the reaction of an amide of an alpha, beta ethylenically unsaturated carboxylic acid and the corresponding aldehyde to produce said N--alkylol amide.

7. A method for preparing a substantially formaldehyde-free, self-curing interpolymer by emulsion or solution polymerization comprising reacting from
   a) from about 75 to about 99.5 percent by weight of at least one monomer selected from the group consisting of butadiene, styrene, ethylene, propylene, isoprene, methyl styrene, vinyl chloride, vinylidene chloride, chloroprene, chlorostyrene, vinyl acetate, acrylonitrile and its homologs, esters of saturated carboxylic acids and acrylic esters of ethylenically unsaturated functionalized monomers and containing 1 to 12 carbon atoms in the alkyl group and where said functionality is selected from the group selected from hydroxyl, carboxyl, amide, and epoxy and vinyl; and
   b) from about 0.5 to about 25 percent by weight of at least one N-alkylol amide of an alpha, beta ethylenically unsaturated carboxylic acid selected from the group consisting of N-ethylol acrylamide, N-ethylol amethacrylamide, N-ethylol maleimide, N-propylol acrylamide, N-propylol methacrylamide, N-propylol malemide, N-butylol acrylamide, N-butylol methacrylamide, N-butylol maleimide, N--benzylol acrylamide, N-benzylol methacrylamide, and mixtures thereof;

and said at least one monomer having at least one comonomer comprising itaconic acid.

8. A method for preparing an interpolymer as set forth in claim 7, wherein said at least one monomer comprises from about 80.0 to about 99.0 percent by weight and said amide comprises from about 1.0 to about 20 percent by weight.

9. An article of manufacture, substantially formaldehyde-free comprising a substrate treated with a self-curing interpolymer comprising repeating units derived from a) from about 75 to about 99.5 percent by weight of at least one monomer selected from the group consisting of butadiene, styrene, ethylene, propylene, isoprene, methyl styrene, vinyl chloride, vinylidene chloride, chloroprene, chlorostyrene vinyl acetate, acrylonitrile and its homologs, esters of saturated carboxylic acids, and containing 1 to 12 carbon atoms in the alkyl group, and acrylic esters of ethylenically unsaturated functionalized monomers and where said functionality is selected from the group selected from hydroxyl, carboxyl, amide, and epoxy and vinyl; and b) from about 0.5 to about 25 by weight of at least one N-alkylol amide of an alpha, beta ethylenically unsaturated carboxylic acid selected from the group consisting of N-ethylol acrylamide, N-ethylol methacrylamide, N-ethylol maleimide, N-propylol acrylamide, N-propylol methacrylamide, N-propylol maleimide, N-butylol acrylamide, N-butylol methacrylamide, N-butylol maleimide, N-enzylol acrylamide, N-benzylol methacrylamide, and mixtures thereof;

and said at least one monomer having at least one comonomer comprising itaconic acid.

10. An article as set forth in claim 9, wherein said amide is produced in situ by the reaction of an amide of an alpha, beta ethylenically unsaturated carboxylic acid and the corresponding aldehyde to produce said N-alkyloamide.

* * * * *